May 23, 1933.　　　D. T. BROWNLEE　　　1,910,319
DRIVING AXLE CONSTRUCTION
Filed Oct. 26, 1931　　2 Sheets-Sheet 1
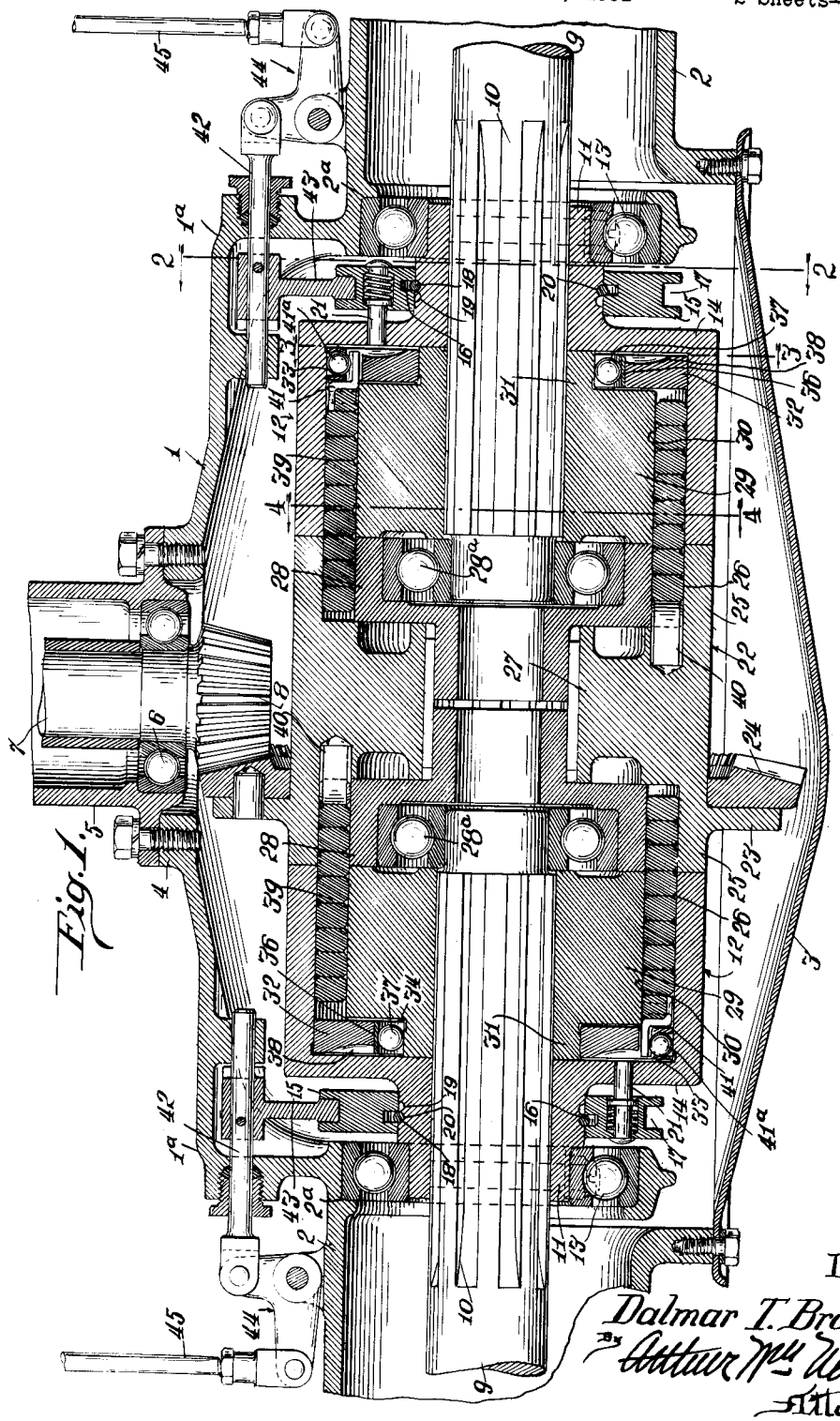
Inventor
Dalmar T. Brownlee
Attorney.

May 23, 1933.　　　　D. T. BROWNLEE　　　　1,910,319
DRIVING AXLE CONSTRUCTION
Filed Oct. 26, 1931　　　　2 Sheets-Sheet 2
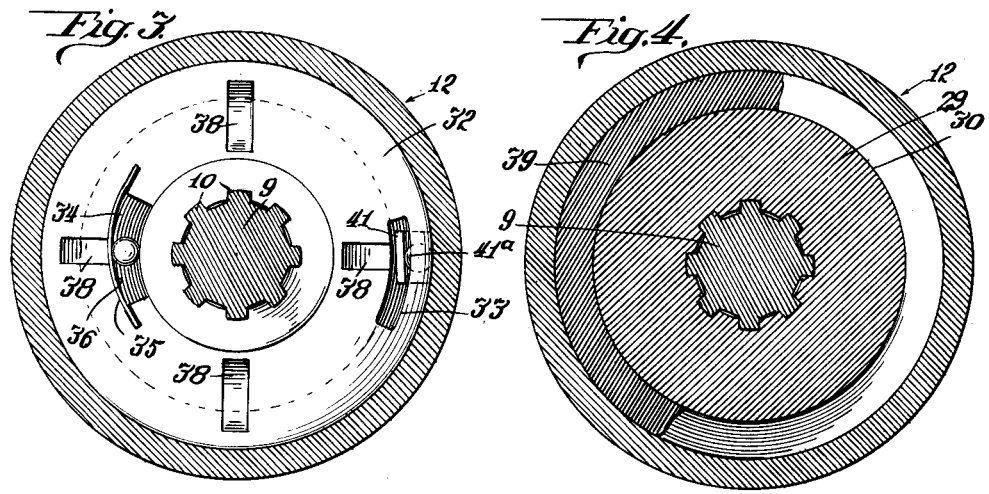
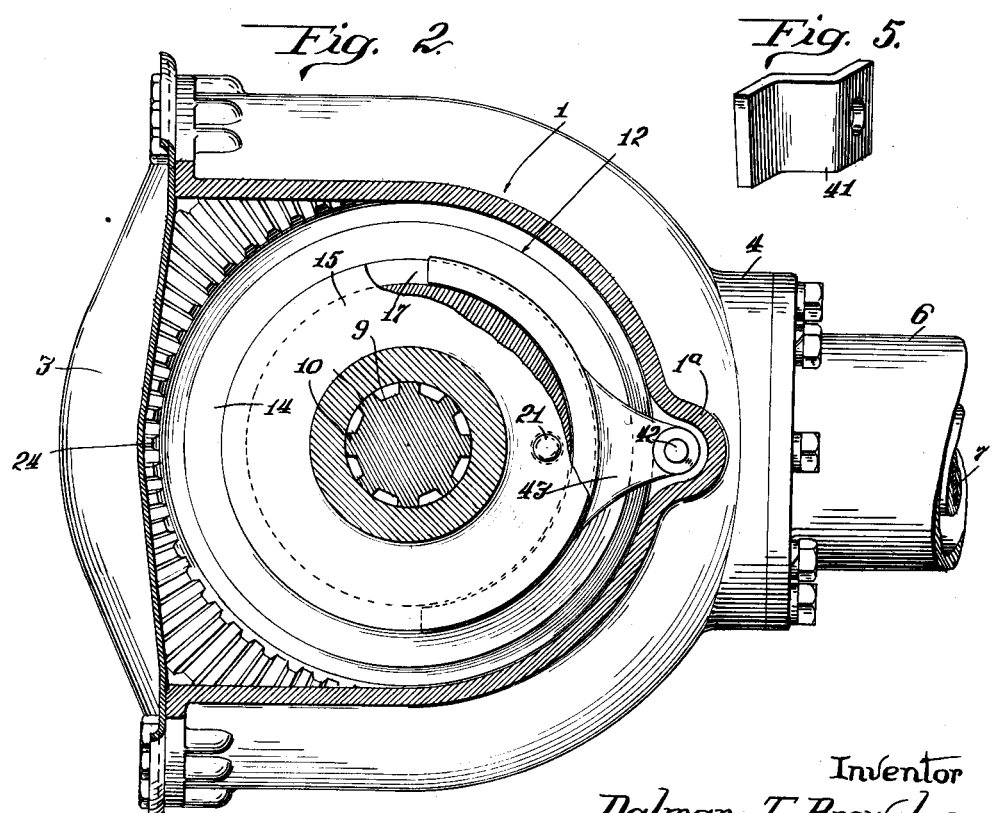
Inventor
Dalmar T. Brownlee
Attorney Patented May 23, 1933

1,910,319

UNITED STATES PATENT OFFICE

DALMAR T. BROWNLEE, OF INDIANAPOLIS, INDIANA, ASSIGNOR TO L. G. S. DEVICES CORPORATION, OF INDIANAPOLIS, INDIANA, A CORPORATION OF INDIANA

DRIVING AXLE CONSTRUCTION

Application filed October 26, 1931. Serial No. 571,179.

This invention relates to improvements in driving axle constructions and it consists of the matters hereinafter described and more particularly pointed out in the appended claims.

The primary object of the invention is to provide a driving axle construction for automotive vehicles of either the front or rear drive type, wherein a differential of movement between the driven shafts is possible without the necessity of the use of pinions as found in a conventional driving axle or differential.

Another object of the invention is to provide an axle construction of this kind wherein a free wheeling action is possible in all forward speeds and reverse and which action may be locked-out when so desired.

Still a further object of the invention is to provide a construction of this kind wherein power is equally distributed to both driven shafts without the possibility of spinning of one of said shafts with respect to the other when the vehicle in which the construction is embodied, becomes mired.

The above mentioned objects of the invention as well as others, together with the many advantages thereof, will more fully appear as I proceed with my specification.

In the drawings:—

Fig. 1 is a longitudinal horizontal sectional view through a driving axle for automotive vehicles, embodying the preferred form of my improved construction.

Fig. 2 is a transverse vertical sectional view through the improved construction as taken on the line 2—2 of Fig. 1.

Figs. 3 and 4 are transverse vertical detail sectional views through parts of the axle construction shown in Fig. 1, as taken on the line 3—3 and 4—4 respectively of said Fig. 1.

Fig. 5 is a perspective view of a certain cam plate associated with one end of each of the clutch springs embodied in my improved construction.

In general, my improved driving axle construction which is applicable to both front and rear drive vehicles, includes aligned driven shafts operatively connected to the driving wheels of the vehicle and a driving member, in turn driven in either forward or reverse by a pinion on the propeller shaft of the vehicle. The driving member which is hereinafter referred to as a ring gear supporting member, is formed to provide a pair of inner and outer clutch members at each end associated with pairs of inner and outer clutch members splined to the driven shafts. Arranged in the annular space between the clutch members of the various pairs are clutch springs each fixed at one end to said ring gear supporting member. Each clutch spring when in its normal unstressed condition has but a slight drag if any, with any of the associated clutch members. Mounted on each inner clutch member on each driving shaft is a disc-like plate, having an arcuate slot in one side to receive a cam plate with which is associated a rolling wedge in the form of a ball and directly opposite the same, said disc-like plate is formed to provide a cam bottomed recess in which a second rolling wedge is provided to engage a part of the inner clutch member on each driven shaft to transmit power thereto.

When the ring gear supporting member is being driven in forward, it acts through the cam plate and ball, to unwind and radially expand the spring into gripping engagement with the outer clutch members to operatively connect them together. When the said ring gear supporting member is being driven in reverse, the other rolling wedge or ball comes into operation so that said springs are wound up and restricted in diameter to grip upon the inner clutch members to transmit power thereto.

The parts are so arranged that when necessity requires one driven shaft to turn faster than the other, as when the vehicle is taking a bend or curve in the road, said shaft overruns the other shaft and the driven member.

When both driven shafts tend to rotate faster than the ring gear supporting member, the clutch springs are automatically released to permit the necessary free wheeling action. Should it be so desired, the free wheeling action may be locked-out so that to all effects, a solid drive axle without differential action is attainable.

Referring now in detail to that embodiment of the invention, illustrated in the accompanying drawings:—1 indicates as a whole the hollow housing of the driving axle of an automotive vehicle, having tubular extensions 2—2 of reduced diameter at each end. Said housing which is open at one side, is there provided with a closure or cover 3 and on the other side of said housing is an opening defined by an annular boss 4 to which a drive or propeller shaft tube 5 is operatively connected at one end. In said end of the said tube is provided an antifriction bearing 6 for the drive or propeller shaft 7 which carries a driving pinion 8 on that end extending into said casing.

9—9 indicates the driven shafts arranged longitudinally in said housing and axially of its extensions 2—2 and with each other. The inner end of each driven shaft 9 is splined as at 10 and operatively engaged upon the outer portion of each splined end is the hub 11 of a cup-like clutch member 12, said clutch members facing toward each other but being longitudinally spaced apart. The outer end of each clutch member 12 is reduced in external diameter and is radially shouldered to receive an associated antifriction bearing 13 engaged in the inner end of the associated tubular extension 2. On said hub between said bearing 13 and the radial end wall 14 of the cup-like clutch member is provided a longitudinally shiftable collar 15. Said collar has internal and external annular grooves 16 and 17 respectively therein and a spring ring 18 is arranged in the internal groove to coact with longitudinally spaced external grooves 19—20 in said hub to hold the collar in one or the other of the positions into which it may be shifted as will later appear. The collar above mentioned carries a longitudinally extending yieldable stud or pin 21 which is adapted to extend through a hole provided therefor, in the end wall 14 of the associated clutch member 12.

Arranged between the inner ends of said clutch members and axially therewith is a differential ring gear supporting member 22. Said member includes a radially extending external flange 23 near one end to which is secured in any suitable manner a ring gear 24 that meshes with the driving pinion 8.

The ring gear supporting member 22 is formed at its ends to provide oppositely facing cup-like clutch members 25—25 that coact with the clutch members 12 in forming clutch spring pockets having internal annular clutch surfaces 26 for a purpose soon to appear. Said ring gear supporting member includes an internally splined hub 27 in which is operatively engaged, oppositely facing clutch member 28—28. Said clutch members 28, each carries an antifriction bearing 28ª for the extremity of the associated driven shaft 9. Operatively engaged upon the splined end of each shaft 9, between the end wall 14 of the clutch member 12 and the clutch member 28, is another clutch member 29 of an external diameter corresponding to that of said clutch member 28 and coacting therewith to provide a clutch surface 30.

The outer end of each clutch member 29 is reduced in diameter to form a hub 31 upon which is rotatively mounted a disc-like plate 32 of a diameter approximating that of the surface 26 before mentioned. In each disc-like plate is provided an arcuate slot 33 and directly opposite the same is a pocket or recess 34 which opens toward the hub 31 of the associated clutch member. This pocket or recess has a cam-shaped surface 35 provided with a wear plate 36 as best shown in Fig. 3 and upon said wear plate is mounted a movable wedge or clutch element in the form of a ball 37. The said pocket is so formed that when the ball is toward one end of the pocket, it will clutch the disc-like plate to the clutch member hub 31 and when said ball is toward the other end of said pocket, said plate and hub are relatively rotatable. In the outer face of each disc-like plate is provided a plurality of recesses 38 any one of which will receive the spring pressed pin 21, before mentioned and carried by the collar 15, said pockets being disposed in the circle of said pin.

Arranged between the clutch surfaces 26 and 30 is a coiled clutch spring 39 of such an external and internal diameter that when in its normal unstressed condition it has little if any frictional drag upon either of said clutch surfaces. The inner end of each spring has a toe 40 for anchoring in a suitable recess provided in the ring gear supporting member and the outer end of each spring is provided with a cam plate 41 which extends into the slot 33 in the associated disc-like plate. This cam plate is inclined in opposition to the pocket 34 and associated with said cam plate is a movable wedge or clutch element 41a for engagement therewith and with the clutch surface 26.

To manually shift each collar 15 before mentioned, in either direction, I provide the following:—

Each end part of the rear axle housing in the plane of boss 4 is provided with a hollow boss-like projection 1ª which forms spaced bearings for a shift rod 42. Fixed to each shift rod within the axle housing and between the spaced bearings mentioned, is a yoke 43 for engagement in the external groove in the shift collar 15. Pivoted on the associated axle extension 2 in line with the boss 1ª, is a bell crank lever 44, one arm of which is connected to the shift rod and the other end of which has a rod 45 connected thereto and leading to a place convenient for manipulation by the operator of the automobile in which the structure is embodied.

In the operation of the structure before mentioned, assume that the ring gear supporting member is being so driven by the pinion 8 as to rotate said supporting member to give forward motion to the vehicle. As each spring 39 is connected to said supporting member by the toe arrangement previously mentioned, it is apparent that in this forward movement of said supporting member, the spring tends to turn with said supporting member. This turning movement of the springs is in a direction tending to unwind the same and in said movement, the "high" end of the cam plate will move the ball 41a into engagement with the clutch surface 26 so that said end of said spring is operatively connected thereto. Further turning of said spring with one end held stationary, will unwind said spring so that it radially expands and increases in diameter, so as to engage the clutch surface 26 and clutch the ring gear supporting member and the clutch member 12 together. As each clutch member 12 has a splined connection with the associated driven shaft 9, it is apparent that said shafts are driven thereby.

When the automobile is taking a curve or bend in the road, it is apparent that the wheel on the outside of the curve or bend must travel faster than the one on the inside of the bend. The outside wheel in this instance will of course, tend to drive its shaft 9 and the clutch member 12 thereon will turn relatively to and in the same direction as the ring gear supporting member and will roll the associated ball 41a down toward the "low" end of the cam plate 41 so as to release the gripping action of the spring from the clutch surface 26. Thus when one wheel is travelling faster than the other, as upon making a curve or bend in the road, the faster wheel overruns the other and slower wheel. When the curve or bend is completed and the vehicle enters a straight away part of the road, the ring gear supporting member automatically acts upon the spring to cause it to again expand and clutch the previously overrunning clutch members together.

Should the vehicle become mired, both wheel driving shafts receive the same driving power so that there is no relative rotation between the shafts as often occurs in driving axle structure embodying the convenient type or gear and pinion differential. With equal traction effect on both driven shafts which in turn drive the wheels, it is possible to drive out of a mired condition. This same effect is attained in instances wherein only one wheel is mired and the other is on a good driving surface so that the mired wheel cannot spin but must rotate in unison with the other wheel. Thus as is apparent both wheels are operative with equal tractive effect whether one or both wheels are mired.

When the ring gear supporting member is being driven in the opposite direction by the pinion 8 as when the transmission of the vehicle has been set for reverse the springs 39 will turn therewith until the cam plate 41 engages the end of the slot 33 and this in turn will act to rotate the disc-like plate 32 with respect to the clutch-like member 25. Through the recesses 34 and balls 37, the cam plate ends of the springs 39 are held against movement so that further movement of the ring gear supporting member acts to wind up and decrease the diameter of said springs so that they contract into gripping relation upon the clutch surfaces 30. This operatively connects the two clutch members 28 and 29 together so that the shafts 9 are driven in the opposite direction. Should one of the shafts in this reverse movement of the vehicle, tend to turn faster than the other as in making a curve, it will overrun the other wheel as is apparent.

In this respect it is pointed out that when the associated transmission is in one of the forward speeds, and the vehicle is descending a grade or the engine has been decelerated so that both driven shafts 9 are wheel driven at a speed greater than that of the ring gear supporting member, the clutch elements 12 will both overrun the supporting member 25 to provide a free wheeling action. When the vehicle is travelling in reverse and the engine is decelerated, and the shafts 9 are wheel driven faster than the ring gear supporting member, the clutch members 29 will overrun the clutch members 28 to provide free wheeling in either direction. Thus it is apparent that free wheeling may be had in any of the forward speeds of the vehicle or in reverse.

Should a solid drive axial without differential action between the driven shafts be desired, the rods 45 are actuated so that the shift rods 42 are moved inwardly. By means of the yoke 43, the collar 15 is shifted toward the end wall 14 of the adjacent clutch member 12 with the result that the spring ring 18 snaps out of the groove 20 in the hub 11 of the clutch member 12 and into the groove 19 therein. In this movement of the collar, the studs 21 are moved inwardly toward the disc-like plate 32 and so soon as one of the recesses 38 therein comes into line with said stud, said stud will snap into the same. This positively connects the disc-like plate to the clutch member 12 and locks-out the action of the clutch spring, regardless of the direction in which the ring gear supporting member is being driven by the pinion 8.

It is apparent from the above, that by the construction described, I have provided a driving axle construction wherein though a differential action is permitted between the driven shafts of the axle, no differential pinion arrangement such as found in the conventional differential is employed. Again, both driven shafts are positively driven with equal force so that there is no wheel spinning when the vehicle is mired. Free wheeling action is available in any of the forward speeds and reverse and should it be so desired, this action may be locked-out of operation at will. As there are no differential pinions employed, the axle structure is quiet in operation.

While in describing the invention, I have referred in detail to the form, arrangement and construction of the various parts thereof, the same is to be considered merely as illustrative so that I do not wish to be limited thereto except as may be specifically set forth in the appended claims.

I claim as my invention:—

1. A driving axle construction embodying therein a driving member and driven shafts, means providing coacting pairs of radially spaced inner and outer clutch members on said driving member and said shafts respectively, and clutch means arranged between and associated with the members of said pairs of clutch members for clutching certain of said clutch members together regardless of the direction of rotation of said driving member.

2. A driving axle construction embodying therein a driving member and driven shafts, means providing coacting pairs of radially spaced inner and outer clutch members on said driving member and said shafts respectively, and clutch means arranged between and associated with the members of said pairs of clutch members for clutching certain of said clutch members together regardless of the direction of rotation of said driving member, said clutch means permitting an overrunning of the shafts with respect to the driving member in the direction they are driven by said driving member.

3. A driving axle construction embodying therein a driving member and driven shafts, means providing a pair of radially spaced inner and outer clutch members between said driving member and each shaft, a clutch spring arranged between and associated with the inner and outer clutch members of each pair and operable to change the diameter for clutching them together regardless of the direction of rotation of said driving member and means associated with each spring for locking out the action thereof, independently of each other.

4. A driving axle construction embodying therein a driving member and driven shafts, means providing a pair of radially spaced inner and outer clutch members between said driving member and each shaft, and a clutch spring arranged between and associated with the inner and outer clutch members of each pair and operable to change its diameter for clutching them together regardless of the direction of rotation of said driving member, said clutch springs permitting an overrunning of the associated shafts with respect to the driving member in the direction they are driven by said driving member.

5. A driving axle construction embodying therein a driving member and driven shafts, means providing coacting pairs of radially spaced inner and outer clutch members on said driving member and shafts respectively, a clutch spring arranged between and associated with the members of said pairs of clutch members for clutching them together regardless of the direction of rotation of said driving means and means for locking out the action of said clutch spring.

6. A driving axle construction embodying therein a driving member and driven shafts, means providing coacting pairs of radially spaced inner and outer clutch members on said driving member and shafts respectively, a clutch spring arranged between and associated with the members of said pairs of clutch members, each spring being operable to change its diameter in two directions for driving the shafts in either direction of rotation of the driving member and means for locking out the action of said springs when said shafts are being driven in one direction or the other.

7. A driving axle construction embodying therein a driving member and driven shafts, means providing coacting clutch members on said driving member and shafts respectively, a clutch spring associated with said clutch members and operating in an increase in diameter to clutch certain of said clutch members together so that said shafts are driven in one direction by said driving member in its rotation in that direction and operating in a decrease in its diameter to clutch certain of said clutch members together so that said shafts are driven in the other direction by said driving member in its rotation in said other direction, and means for locking out the action of said clutch spring.

8. A driving axle of the kind described embodying therein, a driving member having a pair of inner and outer clutch members at each end, driven shafts, each associated with one end of the driving member and coaxial therewith, means providing a pair of inner and outer clutch members on each shaft and associated with a pair of such clutch members on the driving member, to provide a set of such pairs of clutch members and a clutch spring disposed between the clutch members of each set thereof for connecting certain of said clutch members together regardless of the direction of rotation of the driving member.

9. A driving axle of the kind described embodying therein, a driving member having a pair of inner and outer clutch members at each end, driven shafts each associated with one end of the driving member and coaxial therewith, means providing a pair of inner and outer clutch members on each shaft and associated with a pair of such clutch members on the driving member, to provide a set of such pairs of clutch members, a clutch spring disposed between the clutch members of each set thereof and operating in a change in its diameter in one direction or the other to clutch said clutch members together in the rotation of said driving member in one direction or the other.

10. A driving axle of the kind described embodying therein, a driving member having a pair of inner and outer clutch members at each end, driven shafts, each associated with one end of the driving member and coaxial therewith, means providing a pair of inner and outer clutch members on each shaft and associated with a pair of such clutch members on the driving member, to provide a set of such pairs of clutch members, a clutch spring disposed between the clutch members of each set and connected at one end to the driving member and means operating in the initial part of the rotation of said driving member to releasably connect the other end of said springs to the clutch members on the driven shafts whereby the rotation of said driving member acts to change the diameter of said springs to cause them to clutch certain of said clutch members of each set together.

11. In a driving axle, a driving member having a pair of inner and outer clutch members at one end, a driven shaft, means providing a pair of inner and outer clutch members on said shaft to coact with those on the driving shaft to provide a set of such inner and outer clutch members, a clutch spring arranged between said set of clutch members and operatively connected at one end to the driving member and means associated with the other end of said springs for releasably securing them to the clutch members on the driven shaft in the initial part of the rotation of said driving member in either direction.

12. In a driving axle, a driving member having a pair of inner and outer clutch members at one end, a driving shaft, means providing a pair of inner and outer clutch members on said shaft to coact with those on the driving shaft to provide a set of such inner and outer clutch members, a clutch spring arranged between the clutch members of each set and operatively connected at one end to the driving member and a member rotatable with respect to the clutch members on each driven shaft operating in the initial rotation of the driving member in either direction to operatively connect the associated end of the spring to said clutch members on said driven shaft.

13. In a driving axle, a driving member having a pair of inner and outer clutch members at one end, a driven shaft, means providing a pair of inner and outer clutch members on said shaft to coact with those on the driving member to provide a set of such inner and outer clutch members, a clutch spring arranged between the clutch members of said set and operatively connected at one end to the driving member and a member rotatable with respect to the clutch members on the driven shaft operating in the initial rotation of the driving member in either direction to operatively connect the associated end of the spring to said clutch members on said driven shaft and means for locking said rotatable member to said clutch members.

14. In a driving axle, a driving member having a pair of inner and outer clutch members at one end, a driven shaft, means providing a pair of inner and outer clutch members on said shaft to coact with those on the driving member to provide a set of such inner and outer clutch members, a clutch spring arranged between the clutch members of said set and operatively connected at one end to the driving member, a member rotatable with respect to the clutch members on the driven shaft operating in the initial rotation of the driving member in either direction to operatively connect the associated end of the spring to said clutch members on said driven shaft, a collar movable axially of said clutch member and carrying means which when said collar is moved in one direction, locks said rotatable member to said clutch members.

15. In a driving axle construction, a driven shaft, inner and outer clutch members on said shaft providing radially spaced clutch surfaces, a spring disposed in the space between said clutch members and normally out of engagement with both of said clutch members, a plate rotatable on the inner clutch member and having an arcuate slot and a cam shaped recess, a cam plate carried by the end of said spring and disposed in said slot, a rolling wedge coacting with said cam plate for locking said end of said spring to the outer clutch member and a rolling wedge associated with said cam shaped recess for locking said plate to the inner clutch member.

In testimony whereof, I have hereunto set my hand, this 17th day of October, 1931.

DALMAR T. BROWNLEE.